V. OLHOVSKY.
TOOL FOR BENDING WIRE.
APPLICATION FILED JUNE 27, 1918.
1,337,616.
Patented Apr. 20, 1920.
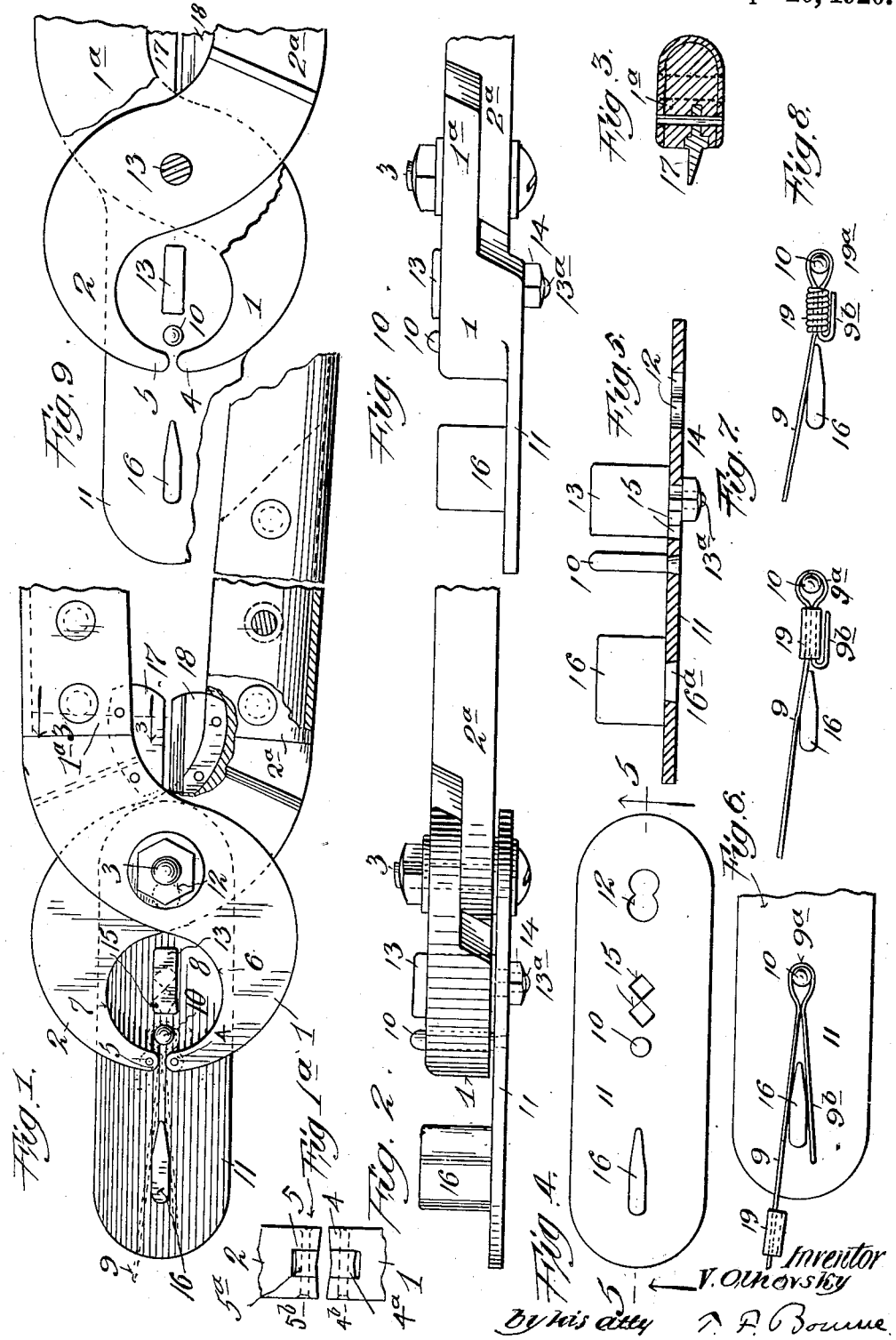

UNITED STATES PATENT OFFICE.

VLADIMIR OLHOVSKY, OF NEW YORK, N. Y., ASSIGNOR TO ERNST J. OHNELL, OF NEW YORK, N. Y.

TOOL FOR BENDING WIRE.

1,337,616.  Specification of Letters Patent.  Patented Apr. 20, 1920.

Application filed June 27, 1918. Serial No. 242,153.

*To all whom it may concern:*

Be it known that I, VLADIMIR OLHOVSKY, a subject of Russia, and resident of New York city, borough of Manhattan, in the county of New York and State of New York, have invented certain new and useful Improvements in Tools for Bending Wire, of which the following is a specification.

The object of my invention is to provide a tool or implement for bending wire and the like, and has particular reference to forming loops or eyes upon wire or the like in an expeditious and accurate manner.

My invention comprises a tool or implement having a pair of coöperative jaws pivotally connected together, adapted to grasp or pinch wire therebetween, somewhat in the nature of a pair of pincers or nippers, and an abutment supported adjacent to the operating ends of said jaws to receive a bent or looped portion of the wire for retaining the latter while the jaws pinch or bend the same into loop or eye-like form. In the example illustrated in the accompanying drawings said abutment is supported by a member carried by the tool, said member also preferably having a stop spaced from said abutment, between which stop and abutment a portion of the wire is located, said stop serving to resist displacement of the wire when being bent.

My invention further comprises novel details of improvement and combinations of parts that will be more fully hereinafter set forth and then pointed out in the claims.

Reference is to be had to the accompanying drawings forming part hereof, wherein, Figure 1 is a plan view of my improved tool, partly broken away; Fig. 1ª is a detail end view of part of Fig. 1; Fig. 2 is an edge view of Fig. 1; Fig. 3 is a section on the line 3, 3, in Fig. 1; Fig. 4 is a face view of the member adapted to support the aforesaid stop and abutment; Fig. 5 is a section on the line 5, 5, in Fig. 4; Figs. 6, 7 and 8 are detail views illustrating steps in fastening together the looped portions of the wire; Fig. 9 is a detail plan view, partly broken, illustrating a modification, and Fig. 10 is an edge view of Fig. 9.

Similar numerals of reference indicate corresponding parts in the several views.

In the drawings the numerals 1, 2, indicate a pair of jaws pivotally connected together, as at 3, by means of a bolt, stud or the like, said jaws being provided with suitable handles $1^a$, $2^a$ that may be arranged for manual operation, which parts may be generally in the form of a pair of pincers or nippers adapted to grasp wire or a strip between the opposing end portions 4, 5, of the jaws. Said jaws between the ends 4, 5, and the pivot 3 are shown recessed respectively at 6, 7, providing a space 8 within which part of an article, such as a wire or strip 9 may be bent. The ends 4, 5, of the jaws may be provided with pivoted rollers $4^a$, $5^a$, to oppose and grip the wire or strip. Said rollers may be located in recesses in the ends 4, 5, of the jaws, pins $4^b$, $5^b$ in said ends pivotally retaining said rollers in said recesses (Figs. 1 and $1^a$). The end edges of the jaws are shown inwardly inclined and the working surfaces of the rollers correspondingly shaped serving to direct wire 9 toward the centers of the rollers. Said rollers serve to grip the wire and roll along it to avoid roughening the wire. If preferred, the ends 4, 5, of the jaws may be without said rollers, to operate directly upon the wire or strip 9, as indicated in Figs. 9 and 10. At 10 is an abutment located within space 8 suitably near to the inner portions of the ends 4, 5, of the jaws 1, 2, around which abutment the desired portion of wire or strip 9 may be bent or looped in position to be pinched or grasped by said jaws. Said abutment 10 is supported by a member 11 carried by the tool. Said member may be supported by the bolt or pivot 3 with the abutment 10 in the space 8, for which purpose member 11 is shown provided with a hole 12 for said bolt or pivot (Fig. 4). Said hole may be of suitable size to freely receive bolt or pivot 3, or may be elongated to permit adjustment of the member 11 longitudinally with respect to the tool for adjustment of abutment 10 with respect to the ends 4, 5, of the jaws, in accordance with the gage of the wire or strip to be bent. I have shown the hole 12 in the form of two adjacent holes merging into one another, although two or more holes may be spaced apart in member 11 if preferred. At 13 is indicated a stop upon member 11 spaced from abutment 10 to permit location of the wire or strip therebetween. Said stop may be adjustably carried by member 11, for which purpose said stop may be provided with a threaded projection 13ª adapted to receive a nut 14 which projection may be placed in a hole 15 in member 12 for securing the stop in position. Two or more such holes 15 may be spaced apart in member 11 to permit stop 13 to be adjusted toward or from the abutment 10 (see Figs. 1 and 4). The hole or holes 15 may be made polygonal and the projection 13ª may be similarly arranged so that the stud 13 will not rotate upon member 11. The hole or holes 15 are in such position in member 11 that the stop 13 will be in space 8 between abutment 10 and bolt or pivot 3. I preferably provide upon member 11 a projection 16 spaced along said member a suitable distance beyond the ends 4, 5, of jaws 1, 2, adapted to receive portions of the wire on opposite sides of said projection to keep the opposing portions of the wire spread to prevent said portions of the wires from overlapping when being squeezed or nipped between the jaws. The projection 16 may have a lug 16ª riveted in a hole in member 11 (Fig. 5), or the parts 11 and 16 may be made in one piece, and the abutment 10 also may be made in one piece with member 11. By having the member 11 pivotally connected with the jaws, as by being supported upon the bolt or pivot 3, said member will accommodate itself and thereby the position of the abutment 10, stop 13 and projection 16 to the operation of the jaws when gripping the wire or strip. The handle portions of the jaws, may, if desired, be provided with opposing cutters 17, 18 for cutting wires.

Instead of member 11 being in a piece of material separate from either of the jaws, said member may be formed integral with or secured to one of the jaws, as indicated in Figs. 9 and 10, where the parts 1, 1ª and 11 are indicated as in a single piece of metal.

In using my improved tool or implement the jaws may be spread apart, the wire or strip 9 may be looped around the abutment 10, as indicated in dotted lines in Fig. 1, then the jaws may be closed to squeeze or nip the opposing portions of the wire or strip to provide the desired loop or eye 9ª therein. The then opposing portions of the wire may be secured together in any suitable manner. One convenient means for such purpose comprises a ferrule or tube 19, which may be slipped upon the wire or strip before it is bent in the tool (Fig. 6), and after the wire is bent such ferrule or tube may be slid along the wire or strip to receive the free end 9ᵇ thereof, which may be bent back to retain the ferrule or tube between such bent portion and the loop or eye 9ª, as indicated in Fig. 7. In Fig. 8 the ferrule 19 is shown in the form of a coiled wire, which may be made separately and utilized in the manner described with respect to Figs. 6 and 7, or may be wound around the opposing portions of the looped wire or strip 9 and the latter portion may then be bent in manner described, as shown in Fig. 8. Of course, it will be understood that the opposing portions of the wire adjacent to the loop or eye 9ª may be fastened together in any other desired manner.

My improved tool will be useful in various relations for forming loops or eyes upon wire or strips, since the operation of bending the latter may be performed quickly and accurately at the desired position. A particular use for my improvements is for forming loops or eyes upon wires for piano strings, for guy wires and the like in flying machines, and for other purposes.

While I have illustrated and described a particular embodiment of my invention it will be understood that the same is not limited to the details of construction and arrangement of parts set forth, as the same may be varied, within the scope of the appended claims, without departing from the spirit of my invention.

Having now described my invention what I claim is:—

1. A tool comprising a pair of jaws pivoted together, and an abutment between the pivot and the operative ends of the jaws to receive an article while being bent around the abutment, and a stop spaced from said abutment to receive an article therebetween to resist displacement of the article while its outer portions are being bent by the jaws beyond the abutment.

2. A tool comprising a pair of jaws pivotally connected together and having free operating portions to grasp an article therebetween, a member on one side of said jaws, an abutment carried by said member between the operating portions of said jaws and said pivot, and a stop on said member spaced from said abutment and from said pivot to resist displacement of an article between said abutment and stop while being bent on the side of the abutment opposite the stop.

3. A tool comprising a pair of jaws pivotally connected together and having free operating portions to grasp an article therebetween, a member on one side of said jaws, an abutment carried by said member adjacent to the operating portions of said jaws and said pivot, a stop on said member spaced from said abutment, and means coöperative between said member and stop for holding the latter rigidly in adjusted position on said member to accommodate wires of different thickness between the abutment and stop and prevent displacement of the latter.

4. A tool comprising a pair of jaws having a pivot connecting them, a member carried by said pivot, an abutment carried by said member within said jaws, and a stop on said member spaced from said abutment within said jaws on the side opposite the operative ends of said jaws between the pivot and the abutment.

Signed at New York city, in the county of New York, and State of New York, this 26th day of June, A. D. 1918.

VLADIMIR OLHOVSKY.